Patented Mar. 25, 1924.

1,488,239

UNITED STATES PATENT OFFICE.

ARTHUR GEORGE GREEN AND STANLEY JOSEPH GREEN, OF MANCHESTER, ENGLAND, ASSIGNORS TO BRITISH DYESTUFFS CORPORATION LIMITED, OF MANCHESTER, ENGLAND.

PROCESS FOR THE MANUFACTURE OF PHTHALIMIDE.

No Drawing. Application filed July 3, 1922. Serial No. 572,724.

*To all whom it may concern:*

Be it known that we, ARTHUR GEORGE GREEN and STANLEY JOSEPH GREEN, both residing at Blackley, Manchester, in the county of Lancashire, England, both subjects of the King of Great Britain and Ireland, have invented certain new and useful Improvements in Processes for the Manufacture of Phthalimide, of which the following is a specification.

It is well known that whilst naphthalene produces phthalic acid upon oxidation with chromic acid the alphanitro derivative of naphthalene gives rise to nitro-phthalic acid with production of little or no phthalic acid (Beilstein and Kurbatow, Ann. 1880 (202) 218). Thus the ring to which the nitro group is attached resists the attack of the oxidizing agent.

We have found that alpha-nitronaphthalene can be directly oxidized by means of air or oxygen in the presence of a suitable catalyst or oxygen carrier and have made the remarkable observation that the main product of this catalytic oxidation is phthalimide and no nitrophthalic acid is produced. In this case, therefore, it is the ring to which the nitro group is attached which suffers oxidation whilst the nitro group contributes a portion of the oxygen required and is itself reduced to the imide group.

We have used hitherto as catalysts or oxygen carriers an oxide of vanadium or an oxide of molybdenum but we do not restrict ourselves to the use of these specific substances. The yield of phthalimide is a satisfactory one and the process, therefore, constitutes a convenient and economical method for the manufacture of this compound.

Temperatures ranging from 300° to 400° C. have hitherto proved to be the most suitable, but higher temperatures may be employed.

The following example will serve to illustrate further the nature of the invention and the manner in which it can be carried into practical effect, but the invention is not confined to the example.

*Example.*—A stream of hot air, in large excess of that theoretically required, is passed over nitronaphthalene heated to a temperature of 120°–130° C., and thence through an iron tube containing the catalyst heated to a temperature of 320°–370° C. The catalyst may be prepared by adding a solution of 150 parts of ammonium vanadate in boiling water to 750 parts of pumice stone in small lumps and evaporating the whole to dryness whilst stirring. The impregnated pumice is transferred to the reaction tube and heated at 250°–300° C. in a current of air for several hours. The passage of the nitronaphthalene vapour is then commenced, the products of the reaction being conducted into a large well-cooled receiver, where the phthalimide is deposited in small colourless crystals. When purified by recrystallization from hot water it forms needles of melting point 229° C. The yield of phthalimide is upwards of 50 per cent of that theoretically possible. A little phthalic anhydride is formed at the same time but as this is more volatile than phthalimide it does not condense so readily but passes forward and may be collected in a second receiver.

What we claim and desire to secure by Letters Patent is:—

1. The process of manufacturing phthalimide by catalytic oxidation of α-nitro-naphthalene.

2. Process of manufacturing phthalimide by oxidizing α-nitro-naphthalene directly by means of oxygen in the presence of a catalytic body containing an electro-negative metal of the fifth and sixth groups of the periodic system, having an atomic weight between 50 and 100 inclusive.

3. Process of manufacturing phthalimide by oxidizing α-nitro-naphthalene directly by means of oxygen in the presence of an oxide of vanadium as catalyst.

4. Process of manufacturing phthalimide by directly oxidizing α-nitro-naphthalene by means of hot air in the presence of oxide of vanadium as catalyst.

In testimony whereof we have signed our names to this specification.

ARTHUR GEORGE GREEN.
STANLEY JOSEPH GREEN.